United States Patent
Southam et al.

(10) Patent No.: US 6,411,376 B1
(45) Date of Patent: *Jun. 25, 2002

(54) METHOD AND APPARATUS FOR MEASURING THE DIRECTION AND POSITION OF ROTATING BODIES

(75) Inventors: Gordon R. Southam, Grass Valley; Patrick H. Dwyer, Penn Valley, both of CA (US)

(73) Assignee: Aim Controls, Inc., Penn Valley, CA (US)

( * ) Notice: Subject to any disclaimer, the term of this patent is extended or adjusted under 35 U.S.C. 154(b) by 11 days.

This patent is subject to a terminal disclaimer.

(21) Appl. No.: 09/602,646

(22) Filed: Jun. 22, 2000

Related U.S. Application Data (63) Continuation of application No. 09/118,354, filed on Jul. 17, 1998, now Pat. No. 6,081,339, and a continuation-in-part of application No. 08/866,405, filed on May 29, 1997, now Pat. No. 5,844,676.
(60) Provisional application No. 60/053,030, filed on Jul. 18, 1997.

(51) Int. Cl.[7] ............................................. G01N 21/00
(52) U.S. Cl. ................. 356/237.1; 356/614; 356/237.2; 356/239.3; 250/231.13; 250/231.16
(58) Field of Search ........................... 356/237.1, 237.2, 356/237.3, 237.4, 237.5, 237.6, 614, 422, 423, 239.3; 250/231.13, 231.16, 231.17, 201.5

(56) References Cited

U.S. PATENT DOCUMENTS

| | | |
|---|---|---|
| 4,680,466 A | 7/1987 | Kuwahara et al. |
| 4,882,479 A | 11/1989 | Hino et al. |
| 4,987,301 A * | 1/1991 | Nakamura ............. 250/231.16 |
| 5,003,171 A | 3/1991 | Paley |
| 5,006,703 A * | 4/1991 | Shikunami et al. .... 250/231.13 |
| 5,057,685 A | 10/1991 | Kurosawa et al. |
| 5,107,107 A | 4/1992 | Osborne |
| 5,126,562 A | 6/1992 | Ishizuka et al. |
| 5,252,825 A | 10/1993 | Imai et al. |
| 5,336,884 A | 8/1994 | Khoshnevisan et al. |
| 5,602,388 A * | 2/1997 | Maenza ................. 250/231.13 |
| 5,883,384 A * | 3/1999 | Kato et al. ............. 250/231.13 |

* cited by examiner

*Primary Examiner*—Frank G. Font
*Assistant Examiner*—Sang H. Nguyen

(57) ABSTRACT

An apparatus and method for measuring in real time the rotational or linear position, direction or velocity of a rotating or linear moving body, particularly an encoded optical disk or strip attached to such rotating or linear moving body. A position measurement pattern comprising a plurality of spaced apart rows of "lands" and "pits" are included on the encoded disk or strip. A position read head with a plurality of laser beams is positioned to reflect laser light off the position measurement pattern on the disk or strip. The relative spacing of the laser beams on the position read head is adjusted to a non-integral multiple of the spacing of the rows. Output signals from the position read head are generated according to reflected laser light from the position measurement pattern which is detected by the error read head. The output signals are converted to position, direction and velocity information.

20 Claims, 12 Drawing Sheets

Counter-Clockwise

FIG. 10

Clockwise

METHOD AND APPARATUS FOR MEASURING THE DIRECTION AND POSITION OF ROTATING BODIES

CROSS-REFERENCE TO RELATED APPLICATIONS

This application claims priority from U.S. provisional application serial No. 60/053,030 filed on Jul. 18, 1997 which is incorporated herein by reference. This application is a continuation-in-part of application serial No. 08/866,405 filed on May 29, 1997, now U.S. Pat. No. 5,844,676. This application is also a continuation of application Ser. No. 09/118,354 filed on Jul. 17, 1998, now U.S. Pat. No. 6,081,339.

STATEMENT REGARDING FEDERALLY SPONSORED RESEARCH OR DEVELOPMENT

Not Applicable

REFERENCE TO A MICROFICHE APPENDIX

Not Applicable

BACKGROUND OF THE INVENTION

1. Field of the Invention

This invention pertains to the use of beams of laser light to measure the position, direction or velocity of a circular rotating device (such as a shaft) or of a linear motion device (such as an x, y table). The laser beams reflect off the encoded surface of a specially prepared disk or strip (similar to the commonly used polycarbonate disk with "pits" and "lands" used to encode audio, computer data, or video information) for the purpose of very high accuracy measurement of the position, velocity, and direction of a rotating or linear motion device to which the disk or strip is attached.

2. Description of the Background Art

There are a variety of devices that have been, and which are currently used, for measuring the rotational position and direction of a rotating body, or the position and direction of a linear device such as an x, y table. These include, without limitation, potentiometers, optical encoders based upon radial lines scribed on a disk, optical encoders based upon bar code technology, encoders based upon on a magnetic disk, and other devices. Most of these devices are of limited resolution or have other limitations such as very high cost or large size.

Presently, there are no devices that provide a high degree of accuracy, at a low cost, in a reasonably sized package. This invention satisfies the need for high resolution and low cost without sacrificing accuracy.

BRIEF SUMMARY OF THE INVENTION

Figure 1:
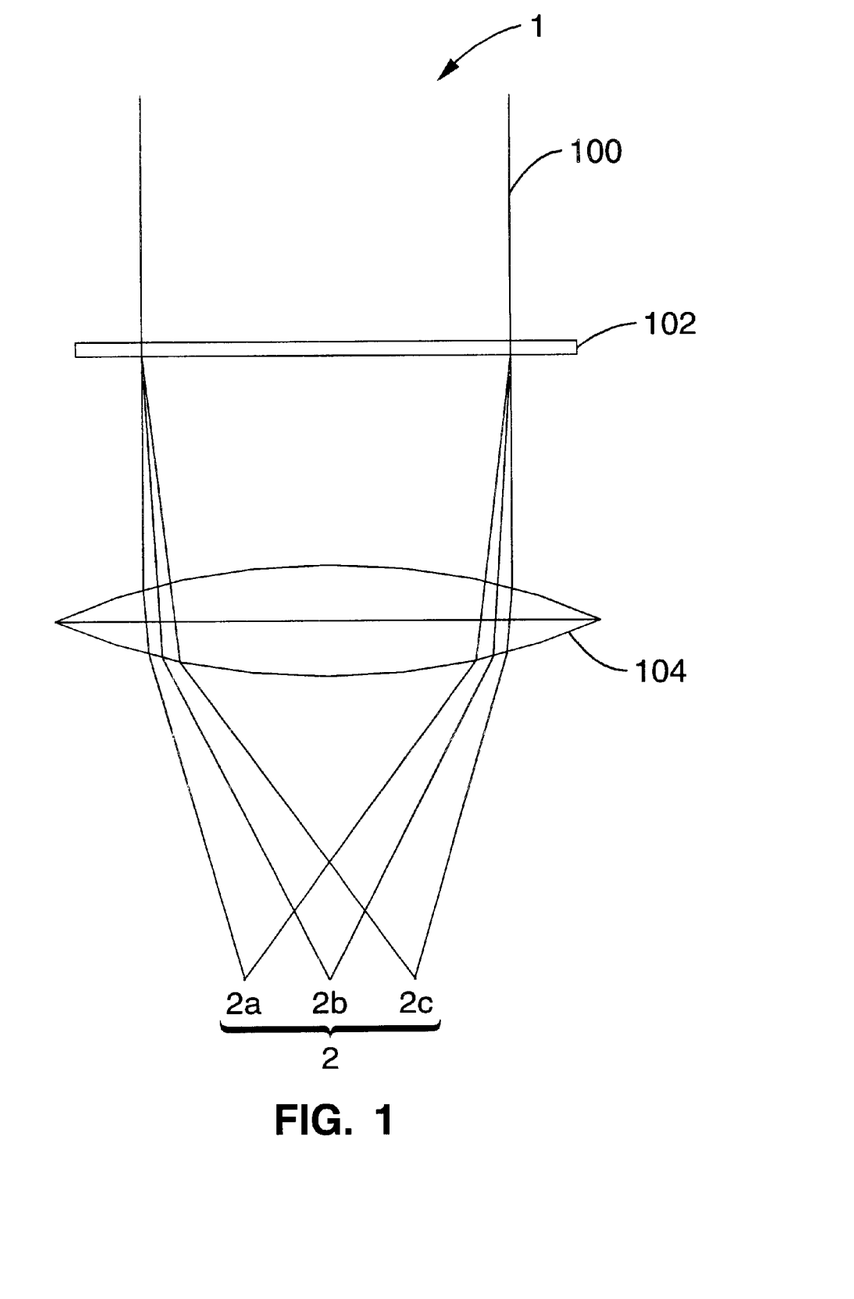
FIG. 1 is a diagrammatic representation of a 3-beam laser system of a type commonly used in standard "CD" players.

The present invention is an apparatus and method for the precision measurement, in real time, of the position and direction of a rotating or linear moving body. Specifically, the invention pertains to a specific pattern and technique for reading such pattern so as to determine not only the number of markings, but also the direction of movement as the markings pass through the focal points of a split laser beam. Although this invention is not limited to a single laser beam that is split into multiple beams by some means (e.g., a diffraction grating), it is possible that multiple laser beams and/or other means for laser beam splitting could be utilized in a similar manner to achieve comparable results. However, the most common and economically feasible type of laser beam system to use for this invention is the 3-beam type used in standard "CD" players (FIG. 1).

In conventional CD use, the three beams are used for two separate purposes. The center beam is used to read the information from the disk which is encoded in the form of a digital code impressed into the disk such that the laser light is alternately scattered away from, and reflected back, into the laser unit as each impressed mark, and unimpressed space, goes by. These impressions are generally referred to as "pits", and the unmarked space around them is generally referred to as a "land", or "lands". The side beams, or "satellite spots" as they are known, are used together to keep the main beam centered over the line of pits which encode the information. None of the encoded information is read by the satellite spots, only the average intensity of each reflected satellite beam is used: the average intensity increases if the laser is off-centered (relative to the centerline of a row of pits being read) towards a particular satellite beam, and decreases when the laser is off-centered toward the other satellite beam.

In contrast, the subject invention utilizes the amplified signal from all three beams and then digitizes these before inputting them to a unique digital counting circuit. The need for the tracking function normally performed by the satellite beams is eliminated by the design of the information pattern, and all three beams are used to read in information about every pit and land that passes beneath them.

The method of the invention comprises, in general terms, the steps of providing a position measurement pattern 3 (FIG. 2) on a disk or strip encoded with "pits" 4 and "lands" 5 (FIG. 2), providing a suitably positioned position read head 1 (FIG. 1) with three lasers that produce laser beams 100 that pass through a diffraction grating 102 and a focus lens 104 to yield three focal spots 2(a), 2(b), 2(c) (FIG. 1) for reading the position measurement pattern 3, positioning or orienting the position read head 1 so that the relative spacing of the three laser focal spots 2 from the position read head 1 is a non-integral multiple of the spacing between the rows 6 (FIG. 2) of pits 4 and lands 5 of the position measurement pattern 3 such that the outputs from the reflected laser focus spots 2 are fully differentiated, communicating the outputs to converting means, and converting the outputs to position count, direction and velocity information.

The object of the invention is to provide an apparatus and method for accurately measuring position, direction and velocity in a rotating or linear moving object. Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DETAILED DESCRIPTION OF THE INVENTION

Referring more specifically to the drawings, for illustrative purposes the present invention is embodied in the apparatus generally shown in FIG. 1 through FIG. 12. It will be appreciated that the apparatus may vary as to configuration and as to details of the parts, and that the method may vary as to details and the order of the steps, without departing from the basic concepts as disclosed herein.

Figure 2:
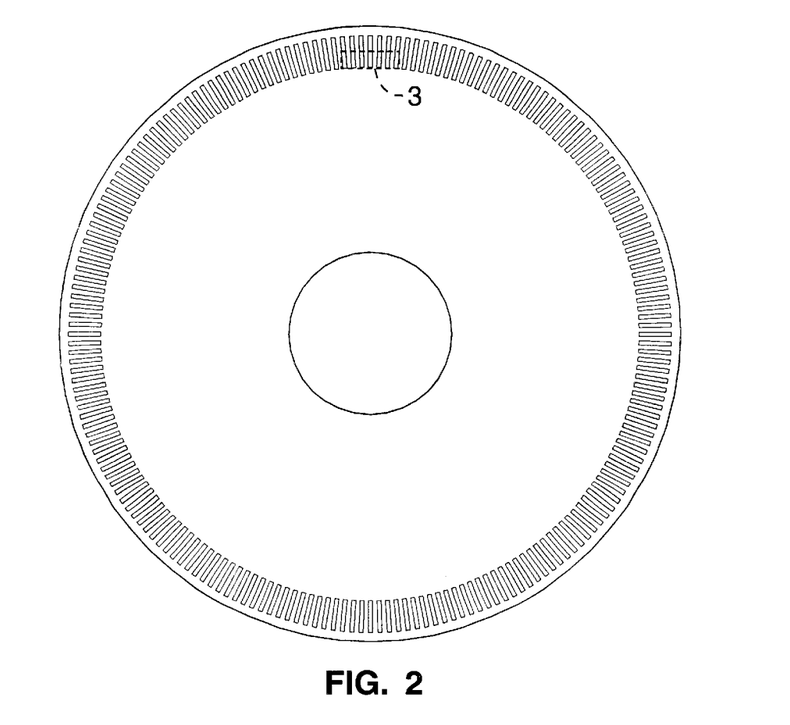
FIG. 2 is a top plan view illustrating, a disk carrying a rotational position measurement pattern in accordance with the invention (the same pattern, but laid out in a straight line would be used in a linear position measurement pattern in accordance with the invention).
Figure 3:
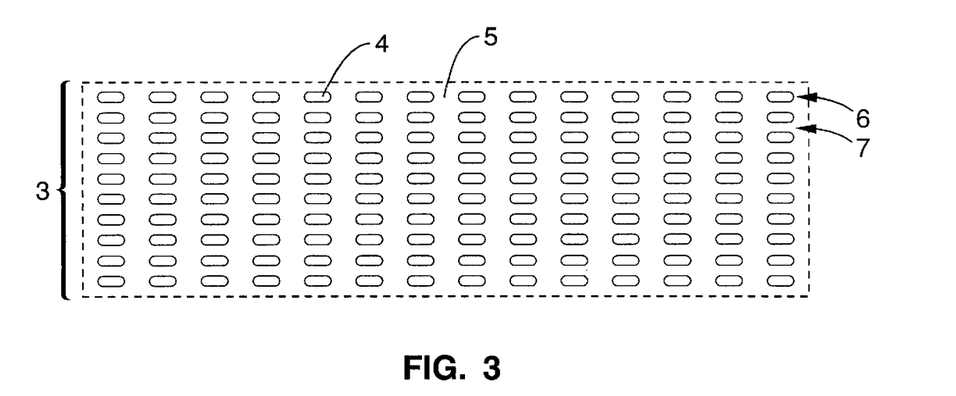
FIG. 3 is a top plan detail view illustrating the measurement pattern carried on the disk of FIG. 2.
Figure 4:
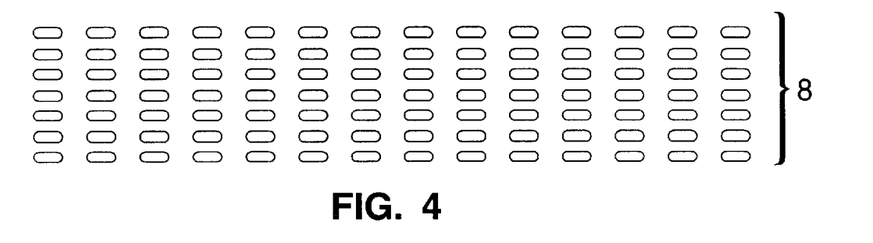
FIG. 4 through FIG. 6 are top plan views illustrating various high, moderate and low densities of the measurement pattern in accordance with the invention for either the rotational or linear embodiment.
Figure 5:
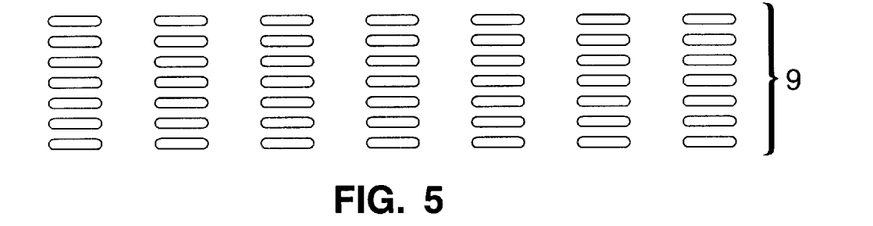
Figure 6:
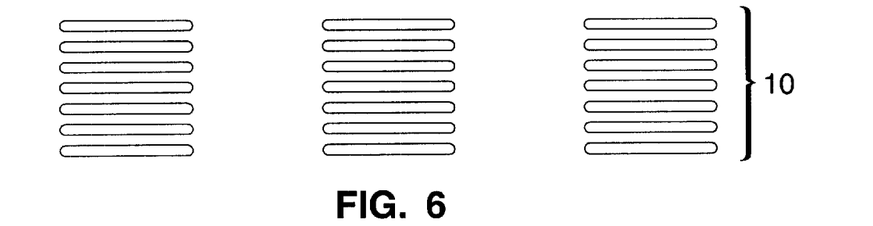

Referring to FIG. 2 the position measurement pattern 3 is generally shown. Referring to FIG. 4 through FIG. 6, more detailed examples are shown of the position measurement pattern 8, 9, and 10. A variety of materials (as described below) could be used to record the position measurement pattern 3. However, the preferred type of material is ae standard molded polycarbonate disk or strip such as that commonly used for compact disks. In such a material, impressions in the reflective surface of the disk or strip which are as deep as ¼th the wavelength of the laser light used to read the disk are called "pits" 4 (FIG. 3), and blank (or untouched) spaces in the reflective surface of the disk or strip are called "lands" 5 (FIG. 3). Additionally, there are re-useable types of material that use a construction whereby pits 4 are registered as areas of decreased reflectivity. Such material could also be utilized in the invention.

As illustrated in FIG. 3, the position measurement pattern 3 consists of "pit rows" 6, spaced apart by "clear rows" 7 at a distance equal to the length of a pit 4, and when aligned, forms stacks and clearings of pits 4. The width of clear rows 7 is a carefully chosen dimension which is less than would be used in music, video or data applications. By spacing the pit rows 6 closer together, it becomes impossible for the laser to determine the radial position of the laser focal spots 2. This is because the vertical line of pits 4 forms a diffraction grating which diffracts the reflected light away from the focus lens 104 shown in FIG. 1, regardless of the exact orientation of the grating within the three focal spots 2 shown in FIG. 1. By recording a sufficient number of rows 6, and ensuring that the three focal spots 2 are positioned within this band of rows 6, the need for any form of radial tracking is eliminated. Regardless of precise radial alignment within the band 8 rows 6, the laser focal spots 2 see only alternating sectors of light and dark. Note in FIG. 1 that the laser position read head, as a combined unit, is shown as element 1.

While FIG. 3 only shows ten rows 6 of pits 4 in the close-up view of lands 5 and pits 4, the band of pits 4 would, in practice, contain hundreds of spaced rows 6. Furthermore, a single disk or linear strip could contain several different bands of rows 6 of pits 4 corresponding to different device resolutions, different operating diameters, etc. Although the upper achievable limit of density for the position measurement pattern 3 is limited by the laser wavelength and the numerical aperture of the focus lens 1, lower densities can easily be achieved by lengthening the pits 4 and lands 5 without changing the pitch or width of each row 6 (see, e.g., FIG. 4 through FIG. 6 which shows three different densities of position measurement pattern 3 respectively). Note that, in the case of a rotary version of the invention, this will result in fewer pits per row 6 at a given radius, and that the pit 4 length must be such that an integer number of pits fit sexlessly around the row 6. For maximum accuracy, the lands 5 between pits 4 must always at least equal the pit 4 length in a given row 6.

By adjusting the angle formed by the line of the direction of motion and the line between the center focal spot 2(*c*) and one or both of the satellite focal spots 2(*a*) and 2(*b*), it is possible to adjust the relative spacing of the focal spots 2 with the pits 4 beneath them. In the case of a rotary device, the pits 4, and the lands 5, are larger for rows 6 nearer the edge of the disk or strip and smaller for rows 6 nearer the center of the disk or strip. The spacing between the laser focal spots 2, however, is fixed for a given laser unit. Although there is variation in the spacing of the laser focal spots 2 in commercial "off the shelf" 3 beam laser assemblies due to manufacturing variations, this is not an important dimension for the usage described here.

Figure 7:
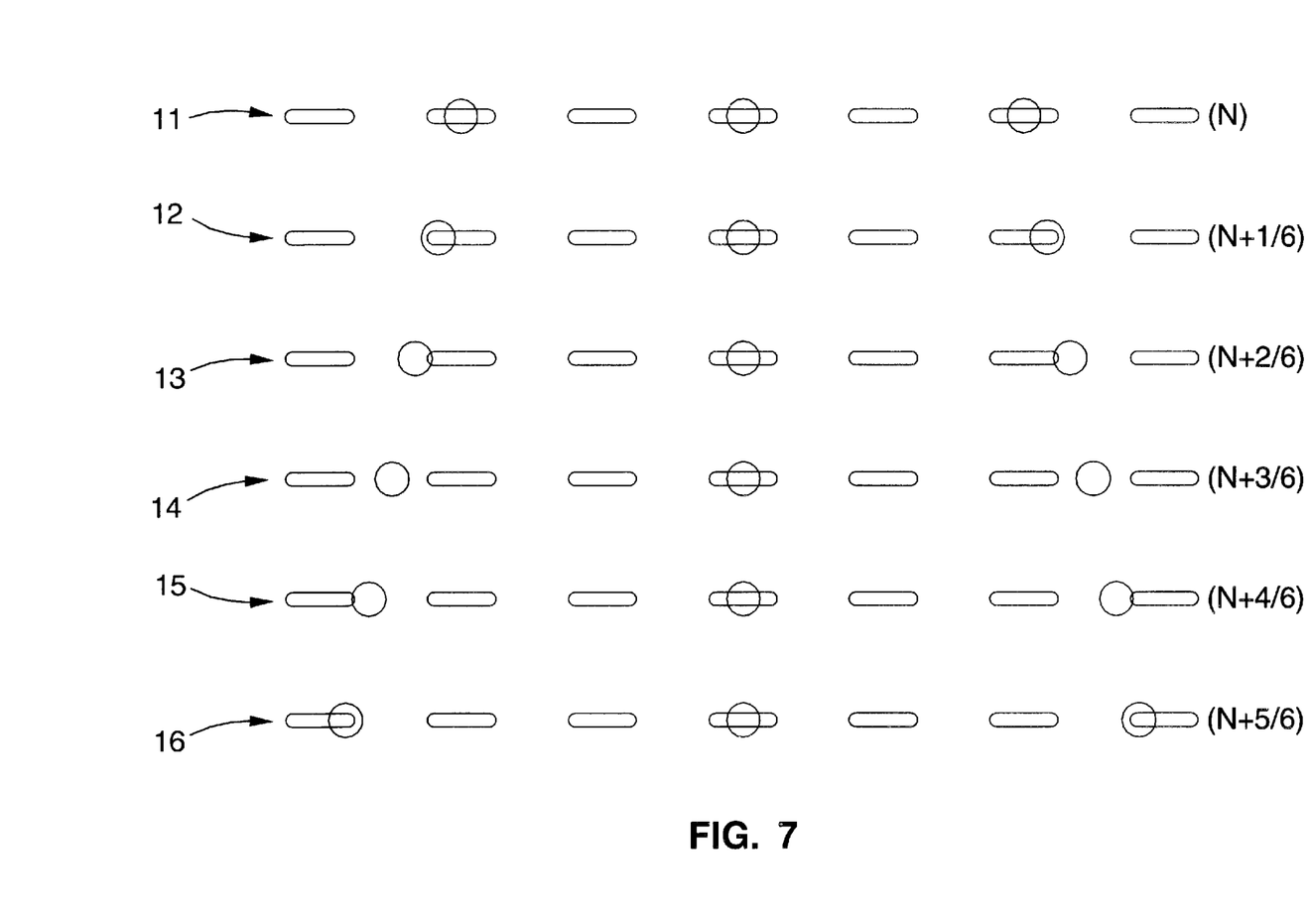
FIG. 7 is a top plan view of a portion of the measurement pattern showing the relationship of the measurement pattern of pits and lands and the three laser spots from the position read head in what is referred to as the "N+fraction" relationship where N=2, illustrated on a single row of pits.
Figure 8:
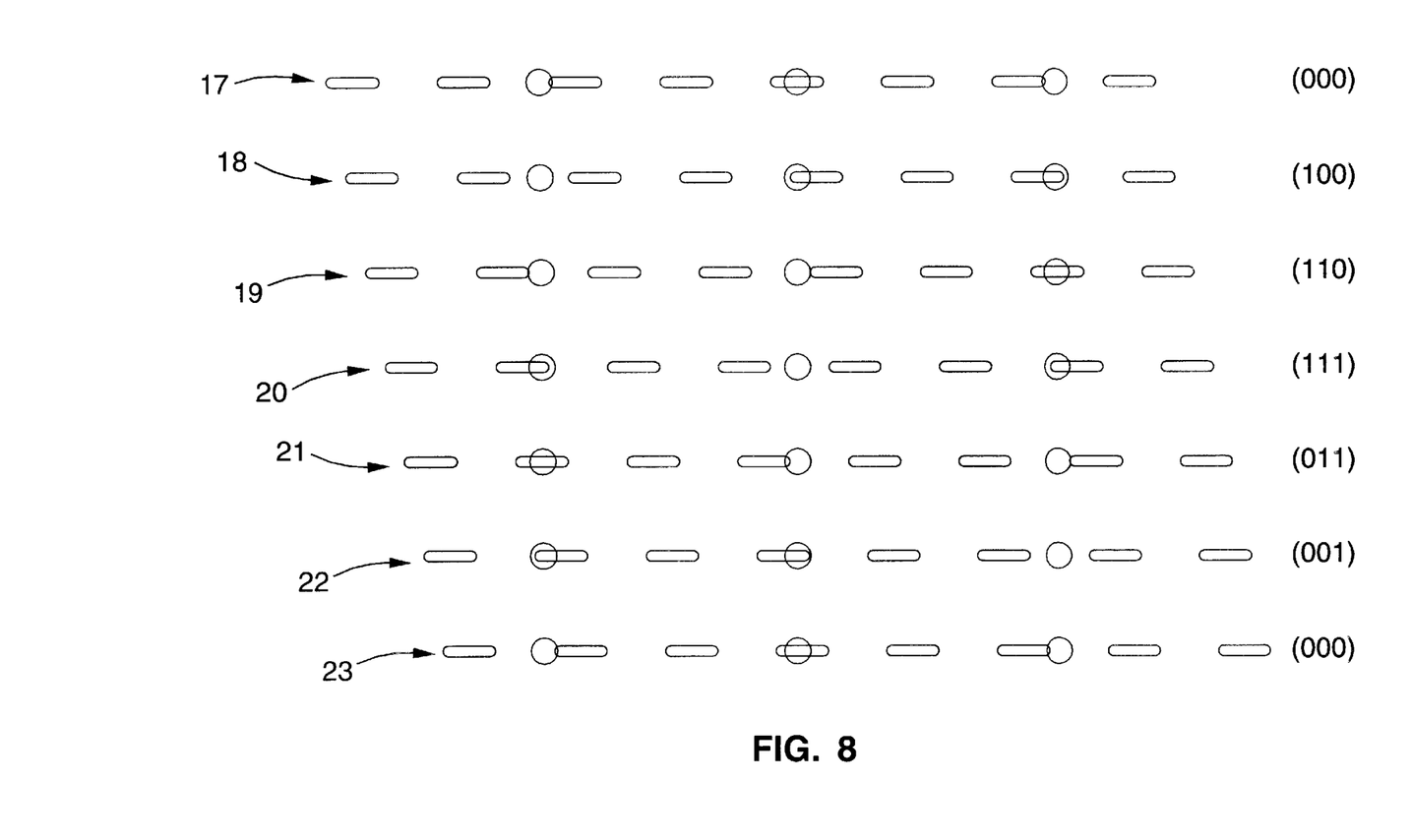
FIG. 8 is a top plan view of a portion of the measurement pattern showing the relationship of the measurement pattern and the three laser spots from the position read head in what is referred to as the "N+⅓" relationship where N=2 and the pits have moved with relation to the three laser spots from the position read head over one period in increments of $\frac{1}{6}^{th}$ of a period. The binary representation of the resulting output is also given.

The "relative spacing" illustration described in FIG. 7 shows six different relative pit 4 spacing examples 11 through 16. These can be thought of as the same set of three focal spots 2 positioned over different rows 6 of pits 4 and presented at different magnifications, or as six different single laser focal spots over the same row. The point is, each of the six cases produces a different pattern of outputs.

Figure 9:
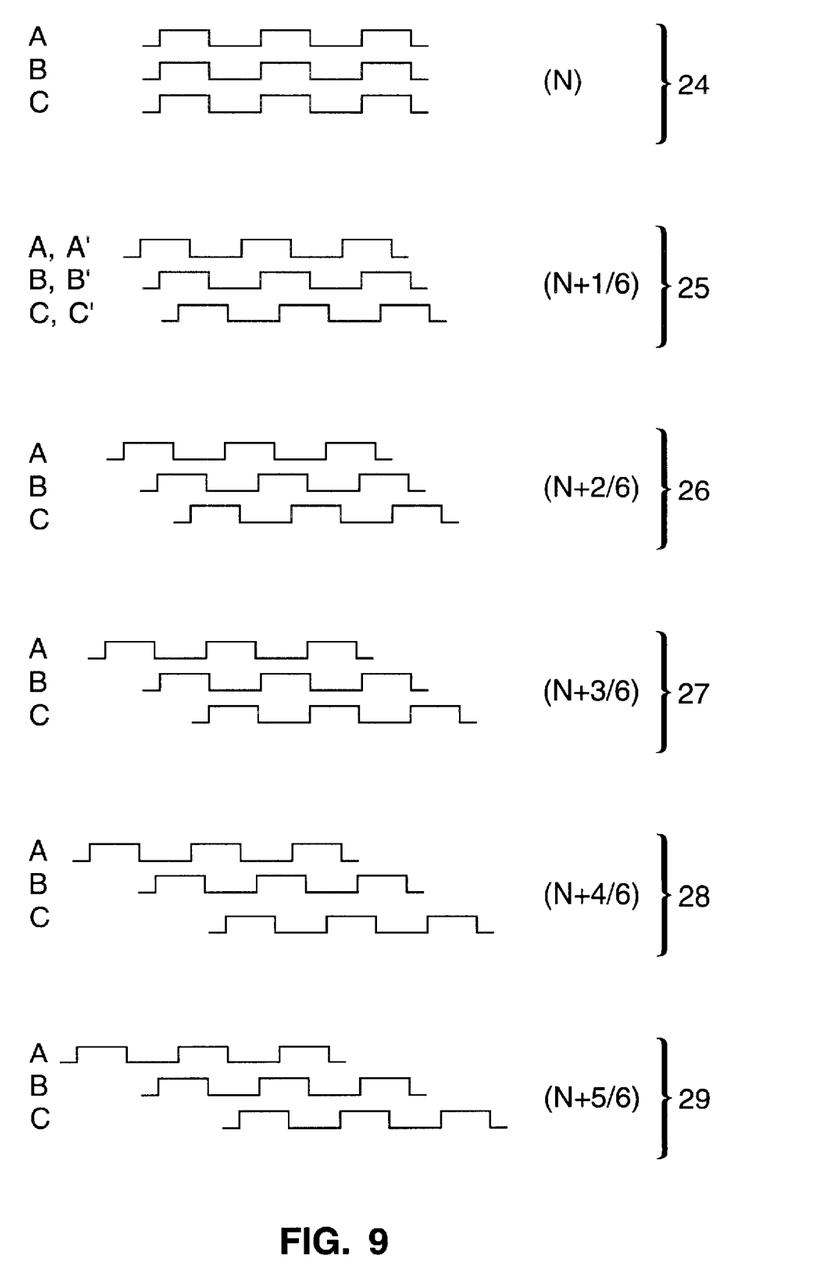
FIG. 9 is a diagrammatic representation of the output signals of the position read head generated in response to a position measurement pattern at various fractional spacings in relationship to the "N+⅙" standard output of the three laser beams.

Referring to FIG. 7 and FIG. 9, in the case of N 11, where there is an integer multiple of pits 4 between each of the three focal spots 2(a), 2(b), or 2(c), all three focal spots see the same information at any given position. This is not particularly useful since the satellite focal spots 2(a) and 2(b) provide no additional information.

Figure 10:
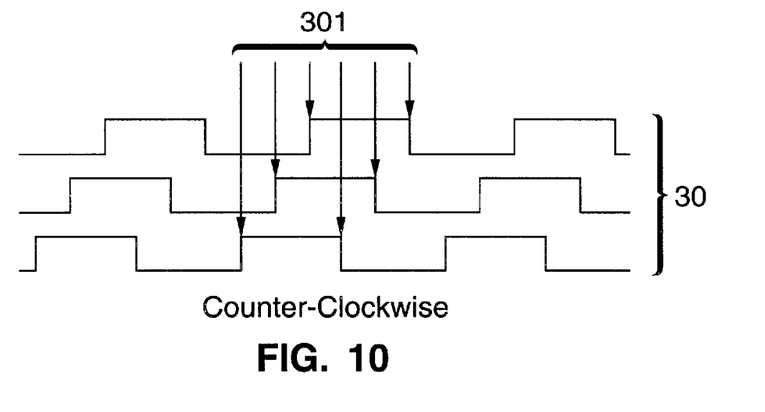
FIG. 10 through FIG. 12 is a combination of a diagrammatic representation of the output signals from the position read head and a top plan view of the corresponding position measurement pattern.
Figure 11:
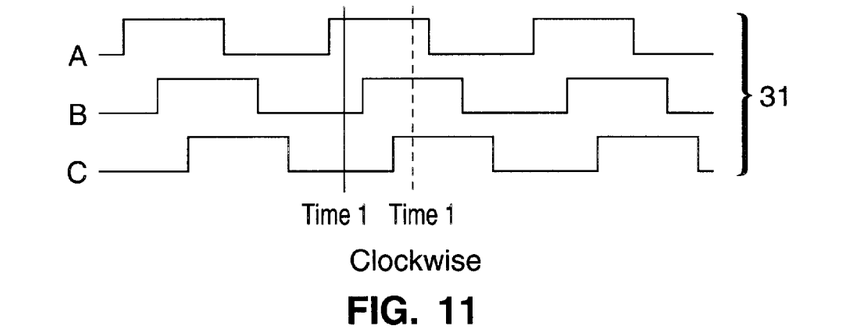
Figure 12:
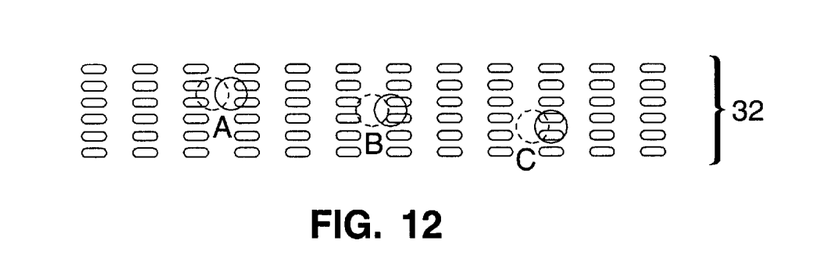

In the case of N+⅙ 12, however, the focal spots 2 are fully differentiated; that is, each focal spot sees a different portion of the row 6 than the other two focal spots at any given instant, and therefore, three times as much information is received than from any single focal spot as in the case of N 11. By establishing a threshold point halfway between the maximum and minimum reflected brightness (just as is done to read a typical CD), the signals from the focal spots 2 can be converted to binary representations: a "1" for light, and "0" for dark as shown in FIG. 9, nos. 24–29. Note that output 24 is not use A'=A, B'=B and C'=C; output 26 shows A=inverted C, B'=B and C'=inverted A; output 27 is not useful; output 28 shows A'=inverted A, B'=B and C'=inverted C; and output 29 shows A'=C, B'=B and C'=A. As the other illustrations show in FIG. 7, FIG. 9 and FIG. 10, through FIG. 12, the result is a repeating pattern which gives not only movement, but also direction information. FIG. 10 shows six translations 301 per cycle; therefore, the resolution is six times the pit count. Note from FIG. 10 and FIG. 11 that direction is determined by sequence. Note also from FIG. 12 that, as the pattern proceeds clockwise, the laser spots appear to move counterclockwise. For example, as shown in timing diagram 31 of FIG. 11, in the case of "time 1", the output is 100. If the disk is moving clockwise, the next code will be 110, and then 111 at "time 2". If instead, the next code after time 1 were 000, then the disk must have moved counter-clockwise. As shown in timing diagram 31 in FIG. 11, in the clockwise direction the pattern proceeds: 100, 110, 111, 011, 001, 000, 100, . . . . As shown in timing diagram 30 in FIG. 10. In the counter-clockwise direction the pattern proceeds is follows: 100, 000, 001, 011, 111, 110, 100, . . . .

Referring to FIG. 7, in the case of N+⅔ 13, fully differentiated information is also available, but the satellite signals are inverted and transposed.

Referring to FIG. 7, in the case of N+⅗ 14, the satellite signals carry only the inverted information of the center focal spot 2(c), and therefore, like the case of N 11, are not useful.

Referring to FIG. 7, in the case of N+⅙ 15, the data is fully differentiated like N+⅙ 12, but the satellite focal spots 2(a) and 2(b) are inverted.

Referring to FIG. 7, in the case of N+⅚ 16, the data is fully differentiated like N+⅙ 12, but the satellite signals are transposed.

The case of N+% is not illustrated in FIG. 7 because it is simply the same as N 11 where N is one integer larger.

In the case of fractions between these cases, the output pattern will be similar to whichever of the four useful cases in FIG. 7 that it is closest to, except that the time spent in each state will not be equal for a given rotational or linear speed, thus the duty cycle of the output waveforms will not be a symmetrical 50%, and thus accuracy could be correspondingly degraded.

It should be noted that the relative spacing between focal spots 2 can also be adjusted by other means such as changing the angle between the line of the focal spots 2 and the line of the rows 6 since the focal spots 2 do not have to be reading the same row 6.

Figure 13:
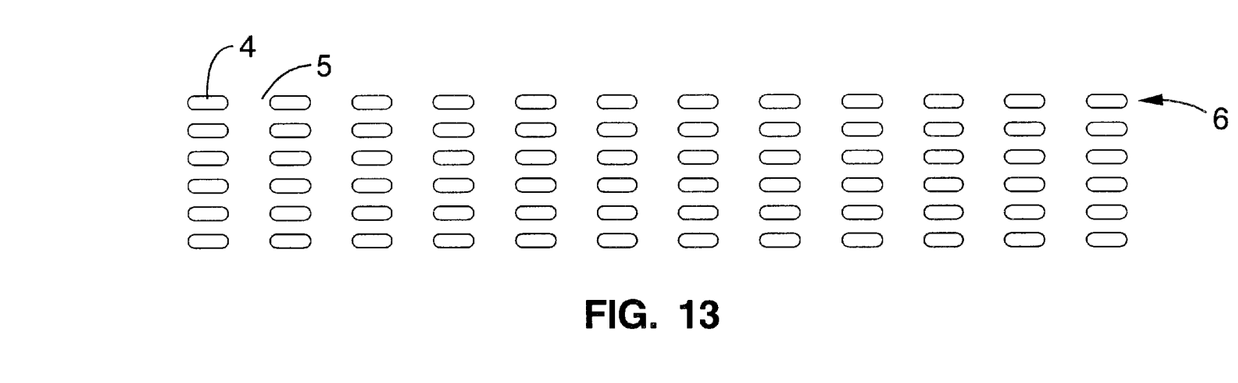
FIG. 13 and FIG. 14 are top plan views of the position measurement pattern without and with a synchronization mark added to said measurement pattern, respectively.
Figure 14:
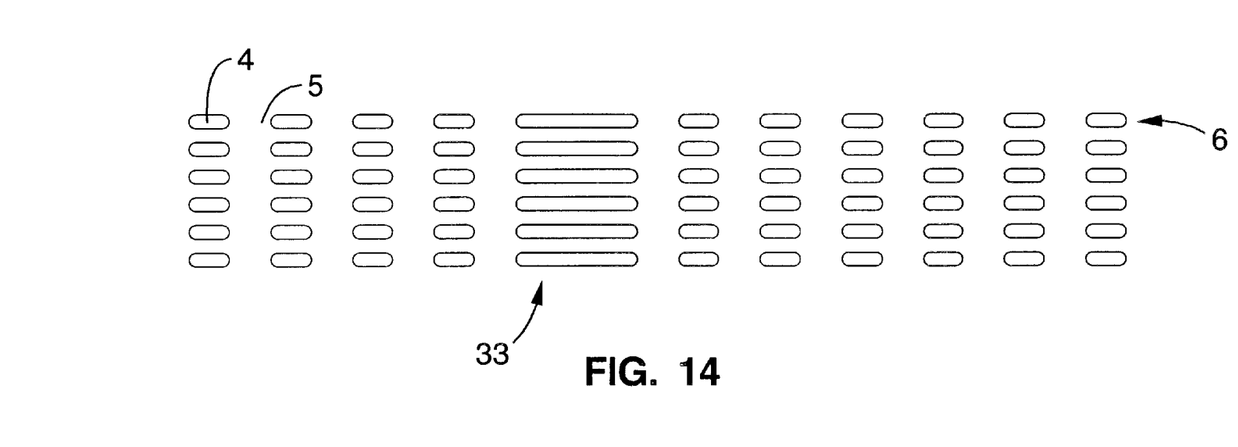

In many applications it is desirable to have a reference signal which marks one exact revolution. This signal is often known in the field as a "sync pulse" because it can be used to synchronize the exact angle of the encoder shaft or an exact "home" position on the linear strip. The subject invention can incorporate such a sync pulse with one modification to the position measurement pattern 3. Referring to FIG. 13 and FIG. 14, at one place on the row 6 of pits 4, and at all corresponding places on all other rows 6, the land 5 between two pits 4 is overwritten to join the two pits 4 into one long pit (hereafter "sync pulse 33") which is three times the length of all other pits 4 on that row 6.

Figure 15:
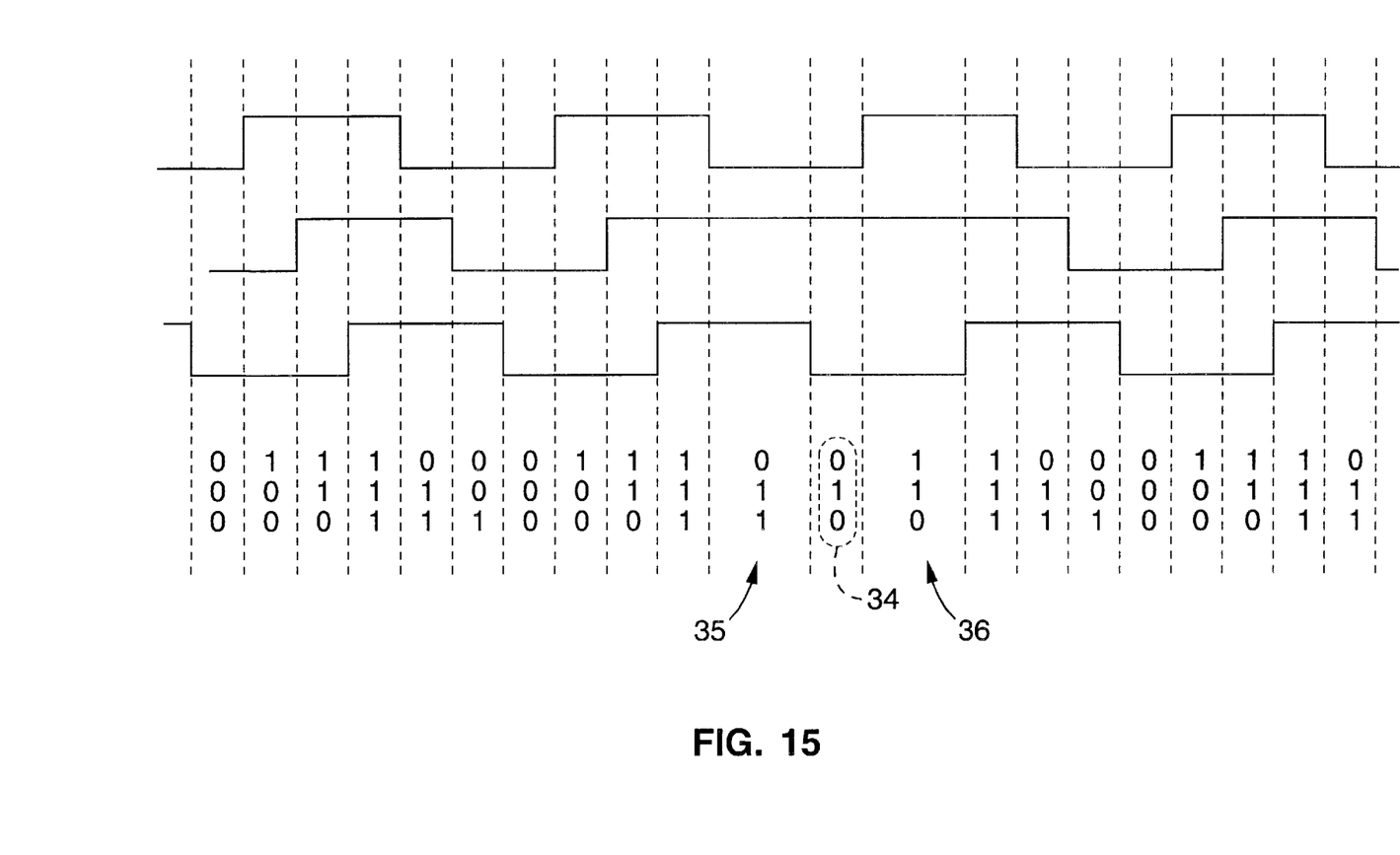
FIG. 15 is a diagrammatic representation of the output signals from the position read head when a synchronization mark is included in the position measurement pattern and the central laser spot passes over the synchronization mark.

It may also be observed in the preceding discussion of the focal spots 2 from the laser beam apparatus adjusted to a relative spacing of N+⅙ 12, the outputs 101, and 010 never occur. Referring to FIG. 15, adding the above described sync pulse 33 modification creates situations where the output 34 (0110) occurs exactly once per revolution or traverse of a linear strip. This output state is the derived sync pulse 33, and can be used to identify that exact point of one revolution (within the resolution of the pattern). This method for generating sync pulse 53 has other ramifications. In addition to the 010 output obtained each time the passes under the center spot, the output 101 is generated each time the long pit passes under each of the satellite focal spots 2(a) and 2(b). One way to avoid this in a rotary measuring device is to angle the line of the focal spots 2 so that one of the satellite focal spots (either 2(a) or 2(b)) reads closer to the center of the disk (or strip) and the other satellite focal spot reads further from the center of the disk (or strip) than the center focal spot 2(c). The sync pulse 33 would then be placed in the pattern only for those rows 6 which will be read by the center focal spot 2(c), and not read by the satellite focal spots 2(a) or 2(b). This way, the output 101 never occurs. If this technique is used, then the overall band of rows 6 must be made wide enough to accommodate a range of angles sufficient to adjust the relative spacing of the focal spots 2 to one of the useful cases as shown, for example, in N+⅙ 12 and N+⅙ 15 in FIG. 4, without adjusting the position of the center focal spot 2(c) (which must be at the center of the subregion of the row 6 which contains the sync pulse 33). To utilize this technique, eccentricity (or linear drift) must be sufficiently controlled to always allow the center focal spot 2(c) to remain over the position measurement pattern 3 containing the long pits 33.

The other main ramification of introducing the sync pulse 33 into the position measurement pattern 3 is that the two logic states on either side of the sync pulse 33 are twice the normal length (see FIG. 15, elements 35 and 36). This requires that the positional count be adjusted when these states occur, and results in degraded resolution over this small interval (2 nominal logic states) on each side of the sync pulse 33. If the 101 outputs are not eliminated as described above, an analogous situation will occur adjacent to each of the 101 output states.

Figure 16A:
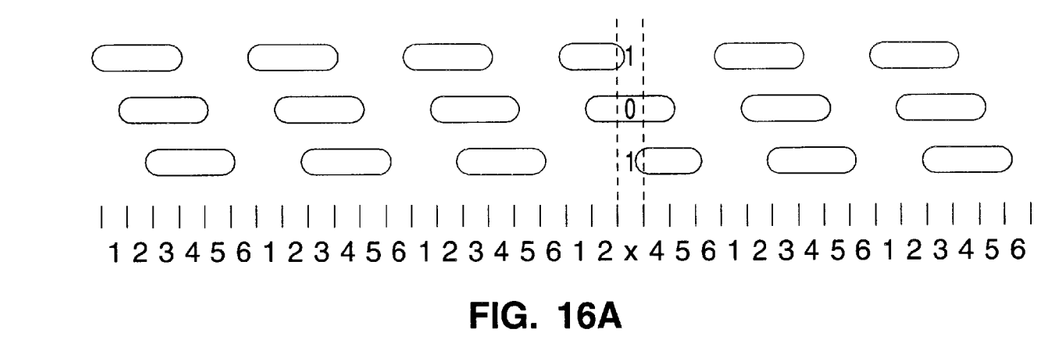
FIGS. 16A and 16B are diagrammatic representations of output signals from the position read head when a synchronization mark is included in the position measurement pattern and such synchronization marks under laser focal spots 2(*a*) and 2(*b*) are shortened (FIG. 16A) and lengthened (FIG. 16B).
Figure 16B:
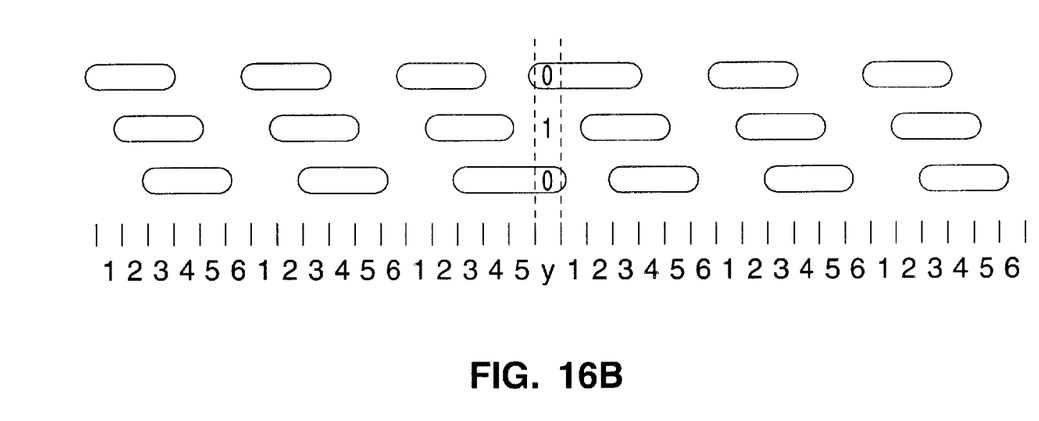
Figure 17A:
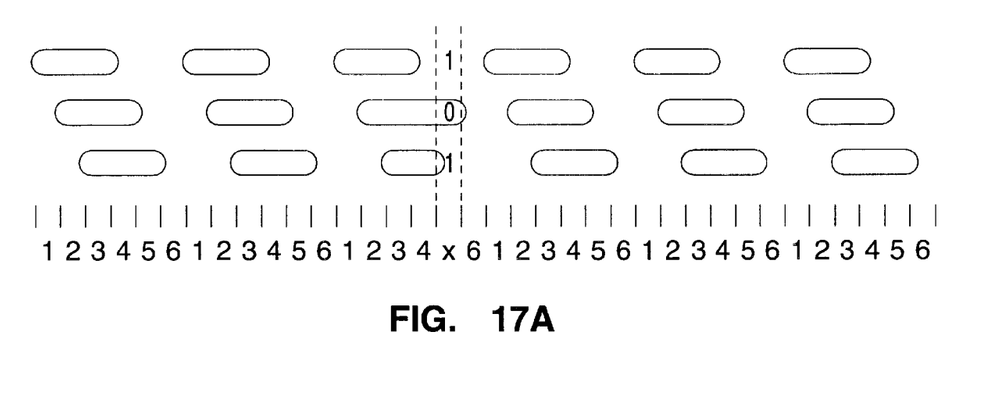
FIGS. 17A and 17B are diagrammatic representations of output signals from the position read head when a synchronization mark is included in the position measurement pattern and such synchronization mark under laser focal spot 2(*b*) is shortened and such synchronization mark under laser focal spot 2(*c*) is lengthened (FIG. 17A), and such synchronization mark under laser focal spot 2(*b*) is lengthened and such synchronization mark under laser focal spot 2(*c*) is shortened (FIG. 17B).
Figure 17B:
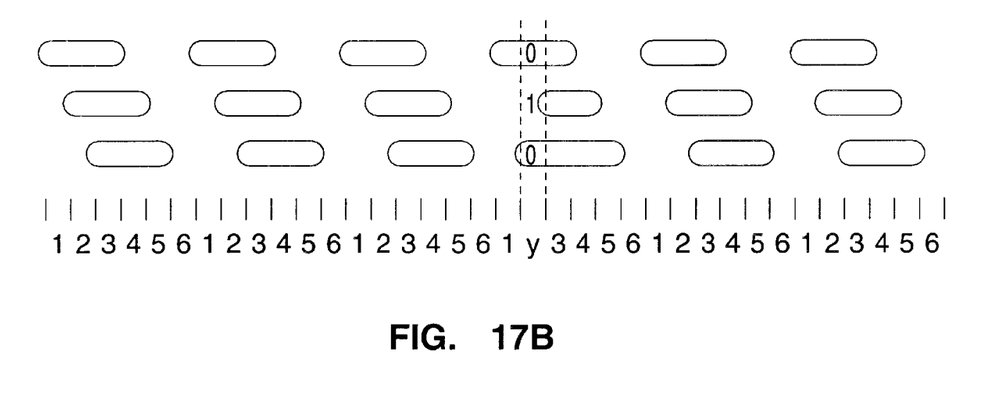
Figure 18A:
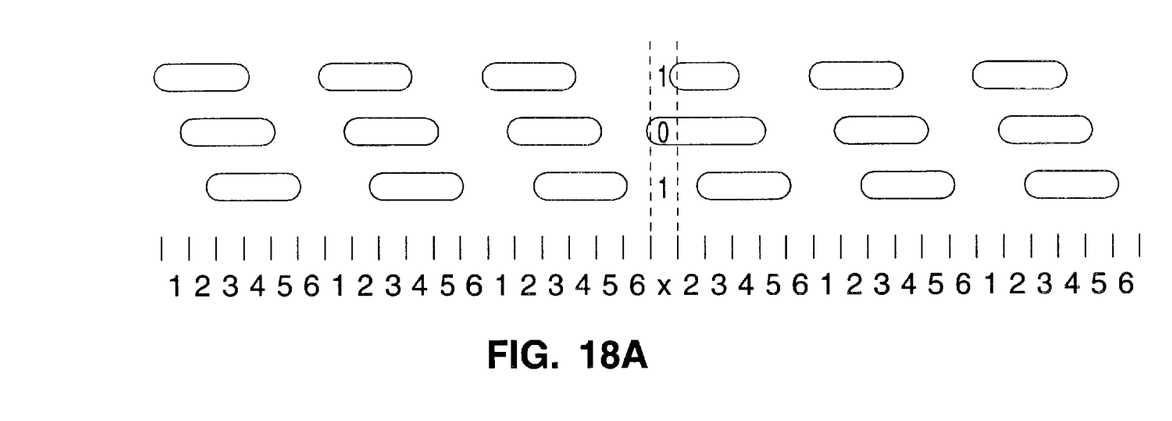
FIGS. 18A and 18B are diagrammatic representations of output signals from the position read head when a synchronization mark is included in the position measurement pattern and such synchronization mark under laser focal spot 2(*a*) is shortened and such synchronization mark under laser focal spot 2(*c*) is lengthened (FIG. 18A), and such synchronization mark under laser focal spot 2(*a*) is lengthened and such synchronization mark under laser focal spot 2(*c*) is shortened (FIG. 18B).
Figure 18B:
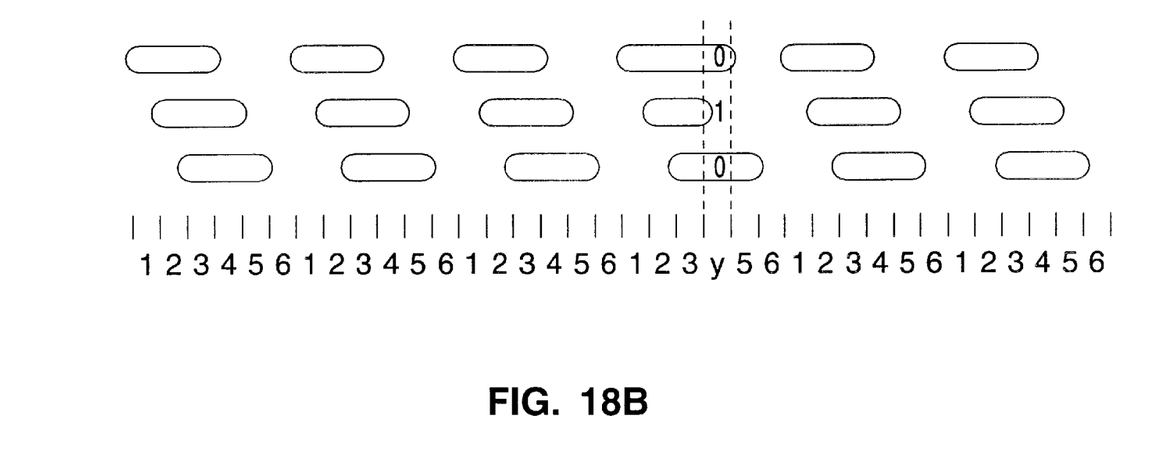

As discussed above, one of the principle problems with the sync pulse 33 addition to the position measurement pattern 3 is that at two points adjacent to the sync pulse 33, there are missing bits of resolution. Although these can be counted back into the count on a sync pulse 33 crossing to keep the count accurate, the point inaccuracy of one bit on each side remains. For cases where the resolution limit of the disk or strip is not a limitation, there is another marking scheme which does not suffer this problem:

To use this method, the angle between the line of the focal spots 2 and the pits 4 must be large enough, and the maximum eccentricity (or linear drift error) small enough such that the three focal spots 2 are reliably reading three different groups or patterns of pit 4 rows of the position measurement pattern 3 on the disk or strip. The sync pulse 33 is then encoded not on the row 6 under the center focal spot 2(c), but as a combination of pattern changes on the rows 6 under two of the three focal spots 2. As can be seen in FIG. 16 thorough FIG. 18, there are six possible permutations of this marking scheme. These six permutations arise from the two possible marking outputs (101 denoted "x" in the drawing figures" and 010 denoted "y"), and the three possible combinations of beam pairs used. FIG. 16 illustrates the use of focal spots 2(a) and 2(b), FIG. 17 illustrates the use of focal spots 2(c) and 2(b), and FIG. 18 illustrates the use of focal spots 2(a) and 2(c).

Once the outputs are configured (as previously discussed, e.g., FIG. 9) as N+⅙ type signals, converting them to a count and direction signal for input into a high-speed bi-directional counter involves the use of a digital state machine which looks for changes in the output state, and based upon the rules of the position measurement pattern 3 predicts what should come next in a clockwise or counter-clockwise direction (or if a valid synch state could be next, its state). When a change of state occurs, the state machine compares the new state to its last predictions, sets the direction signal accordingly, and outputs a count pulse. If the new state is a valid 010, or 101 and sync pulse 33 as discussed in the first example above is being used, an extra count pulse is issued upon entering and upon leaving the state to compensate for the adjacent wide states as noted above.

Although the description above contains many specificities, these should not be construed as limiting the scope of the invention but as merely providing illustrations of some of the presently preferred embodiments of this invention. Thus the scope of this invention should be determined by the appended claims and their legal equivalents.

What is claimed is:

1. An apparatus for measuring the rotational position, direction or velocity of a shaft or other circular rotating device, comprising:
    (a) a position measurement pattern, said position measurement pattern located on a disk attached to said rotating device, said position measurement pattern including a plurality of "lands" and "pits" that produce different output patterns depending upon the direction of rotation; and
    (b) a position read head, said read head positioned adjacent to said disk, said read head including a plurality of laser beams, said laser beams positioned to direct light towards said position measurement pattern, said position read head including means for detection of laser light reflected by said position measurement pattern, said receiver means producing output signals correlated in both direction and position to detected said laser light reflected by said position measurement pattern;
    wherein said position read head comprises:
        (I) three spaced apart laser beams, said three laser beams positioned on said position read head in a relationship that correlates mathematically to the position measurement pattern; and
        (ii) means for adjusting the relative spacing of a plurality of laser beams with respect to the spacing of said lands and pits of said position measurement pattern,
    (c) wherein said position read head comprises:
        (i) three spaced apart laser beams, said three laser beams positioned on said position read head in a relationship that correlates mathematically to the position measurement pattern; and
        (ii) means for adjusting the relative spacing of a plurality of laser beams with respect to the spacing of said lands and pits of said position measurement pattern.

2. An apparatus as recited in claim 1, wherein said spacing of said laser beams on said position read head is equal to a non-multiple of the spacing between said lands and pits of said position measurement pattern.

3. An apparatus as recited in claim 1, further comprising means for converting said output signals from said position read head into count and direction signals.

4. An apparatus as recited in claim 1, wherein said pits and lands having widths which are below the diffraction limit of the light from said lasers on said position read head.

5. An apparatus as recited in claim 1, wherein said position pattern further comprises a plurality of rows of lands and pits spaced apart at a distance less than the diffraction limit of the light from said lasers on said position read head.

6. An apparatus as recited in claim 1:
    wherein said position measurement pattern comprises at least one index mark;
    said at least one index mark comprising a pit in a row of pits in said position measurement pattern that has a different length than the other said pits in said row of pits.

7. An apparatus as recited in claim 6:
    wherein said pit having a different length than the other said pits in said row of pits has a length selected from the group consisting essentially of two-thirds the length of the other said pits in said row of pits, of one and one-third the length of the other said pits in said row of pits, and three times the length of the other said pits in said row of pits.

8. An apparatus for measuring rotational position, direction and velocity, comprising:
    (a) an optical disk, said disk having a rotational axis;
    (b) a position measurement pattern, said position measurement pattern included on said optical disk, said position measurement pattern including a plurality of spaced apart rows of lands and pits; and
    (c) a position read head, said read head located adjacent to said optical disk, said position read head including a plurality of laser beams, said laser beams positioned to direct light towards said position measurement pattern, said position read head including receiver means for detection of laser light reflected by said position measurement pattern, said receiver means producing output signals responsive to detected said laser light reflected by said position measurement pattern;
    wherein said position read head comprises:
        (I) three spaced apart laser beams, said three laser beams positioned on said position read head in a relationship that correlates mathematically to the position measurement pattern; and
(ii) means for adjusting the relative spacing of a plurality of laser beams with respect to the spacing of said lands and pits of said position measurement pattern,
(d) wherein said position read head comprises:
(i) three spaced apart laser beams, said three laser beams positioned on said position read head in a relationship that correlates mathematically to the position measurement pattern; and
(ii) means for adjusting the relative spacing of a plurality of laser beams with respect to the spacing of said lands and pits of said position measurement pattern.

9. An apparatus as recited in claim 8:
wherein said position measurement pattern comprises at least one index mark;
said at least one index mark comprising a pit in a row of pits in said position measurement pattern that has a different length than the other said pits in said row of pits.

10. An apparatus as recited in claim 9:
wherein said pit having a different length than the other said pits in said row of pits has a length selected from the group consisting essentially of two-thirds the length of the other said pits in said row of pits, of one and one-third the length of the other said pits in said row of pits, and three times the length of the other said pits in said row of pits.

11. An apparatus for measuring the linear position, direction or velocity of a body in linear motion, comprising:
(a) a position measurement pattern, said position measurement pattern located on an optical strip attached to said body, said position measurement pattern including a plurality of spaced apart lands and pits that produce different output patterns depending upon the direction of motion; and
(b) a position read head, said read head positioned adjacent to said strip, said read head including a plurality of laser beams, said laser beams positioned to direct light towards said position measurement pattern, said position read head including means for detection of laser light reflected by said position measurement pattern, said receiver means producing output signals correlated in both direction and position to detected said laser light reflected by said position measurement pattern;
(c) wherein said position read head comprises:
(i) three spaced apart laser beams, said plurality of laser beams positioned on said position read head in a relationship that correlates mathematically to the position measurement pattern; and
(ii) means for adjusting the relative spacing of said three laser beams with respect to the spacing of said rows of lands and pits of said position measurement pattern,
wherein said position read head comprises:
(I) three spaced apart laser beams, said three laser beams positioned on said position read head in a relationship that correlates mathematically to the position measurement pattern; and
(ii) means for adjusting the relative spacing of a plurality of laser beams with respect to the spacing of said lands and pits of said position measurement pattern.

12. An apparatus as recited in claim 11, wherein said spacing of said laser beams on said position read head is equal to a non-multiple of the spacing between said rows of lands and pits of said position measurement pattern.

13. An apparatus as recited in claim 11, further comprising means for converting said output signals from said position read head into count, direction and velocity signals.

14. An apparatus as recited in claim 11, wherein said rows each comprise a plurality of alternating pits and lands, said pits and lands having widths which are below the diffraction limit of the light from said lasers on said position read head.

15. An apparatus as recited in claim 11, wherein said position pattern further comprises a plurality of rows of lands and pits spaced apart at a distance less than the diffraction limit of the light from said lasers on said position read head.

16. An apparatus as recited in claim 11:
wherein said position measurement pattern comprises at least one index mark;
said at least one index mark comprising a pit in a row of pits in said position measurement pattern that has a different length than the other said pits in said row of pits.

17. An apparatus as recited in claim 16:
wherein said pit having a different length than the other said pits in said row of pits has a length selected from the group consisting essentially of two-thirds the length of the other said pits in said row of pits, of one and one-third the length of the other said pits in said row of pits, and three times the length of the other said pits in said row of pits.

18. An apparatus for measuring linear position, direction and velocity comprising:
(a) an optical strip;
(b) a position measurement pattern, said position measurement pattern included on said optical strip, said position measurement pattern including a plurality of spaced apart rows of lands and pits; and
(c) a position read head, said read head located adjacent to said: optical strip, said position read head including a plurality of laser beams, said laser beams positioned to direct light towards said position measurement pattern, said position read head including receiver means for detection of laser light reflected by said position measurement pattern, said receiver means producing output signals responsive to detected said laser light reflected by said position measurement pattern;
(d) wherein said position read head comprises:
(i) three spaced apart laser beams, said plurality of laser beams positioned on said position read head in a relationship that correlates mathematically to the position measurement pattern; and
(ii) means for adjusting the relative spacing of said three laser beams with respect to the spacing of said rows of lands and pits of said position measurement pattern,
wherein said position read head comprises:
(I) three spaced apart laser beams, said three laser beams positioned on said position read head in a relationship that correlates mathematically to the position measurement pattern; and
(ii) means for adjusting the relative spacing of a plurality of laser beams with respect to the spacing of said lands and pits of said position measurement pattern.

19. An apparatus as recited in claim 18:
wherein said position measurement pattern comprises at least one index mark;

said at least one index mark comprising a pit in a row of pits in said position measurement pattern that has a different length than the other said pits in said row of pits.

20. An apparatus as recited in claim 19:
wherein said pit having a different length than the other said pits in said row of pits has a length selected from the group consisting essentially of two-thirds the length of the other said pits in said row of pits, of one and one-third the length of the other said pits in said row of pits, and three times the length of the other said pits in said row of pits.

* * * * *